(12) United States Patent
Guo et al.

(10) Patent No.: US 10,447,964 B2
(45) Date of Patent: Oct. 15, 2019

(54) INTERFACE CONVERSION CIRCUIT, DISPLAY PANEL DRIVING METHOD AND DISPLAY APPARATUS

(71) Applicants: BOE TECHNOLOGY GROUP CO., LTD., Beijing (CN); BEIJING BOE DISPLAY TECHNOLOGY CO., LTD, Beijing (CN)

(72) Inventors: Luqiang Guo, Beijing (CN); Zongze He, Beijing (CN); Weihao Hu, Beijing (CN)

(73) Assignees: BOE Technology Group Co., Ltd., Beijing (CN); Beijing BOE Display Technology Co., Ltd., Beijing (CN)

(*) Notice: Subject to any disclaimer, the term of this patent is extended or adjusted under 35 U.S.C. 154(b) by 944 days.

(21) Appl. No.: 14/429,120

(22) PCT Filed: Jun. 23, 2014

(86) PCT No.: PCT/CN2014/080508
§ 371 (c)(1),
(2) Date: Mar. 18, 2015

(87) PCT Pub. No.: WO2015/109744
PCT Pub. Date: Jul. 30, 2015

(65) Prior Publication Data
US 2015/0381928 A1 Dec. 31, 2015

(30) Foreign Application Priority Data
Jan. 22, 2014 (CN) .......... 2014 1 0030869

(51) Int. Cl.
*H04N 7/01* (2006.01)
*G09G 5/00* (2006.01)
*G09G 3/20* (2006.01)

(52) U.S. Cl.
CPC .......... *H04N 7/01* (2013.01); *G09G 3/20* (2013.01); *G09G 5/006* (2013.01);
(Continued)

(58) Field of Classification Search
CPC .......... H04N 7/01; H04N 7/0125; G09G 3/20; G09G 2370/14; G09G 5/006; G09G 2370/20; G09G 2370/10; G09G 5/005
See application file for complete search history.

(56) References Cited

U.S. PATENT DOCUMENTS

2008/0186292 A1 8/2008 Park et al.
2011/0052142 A1* 3/2011 Sultenfuss .......... H04N 5/46
386/232

(Continued)

FOREIGN PATENT DOCUMENTS

CN  101420572 A  4/2009
CN  101437132 A  5/2009

(Continued)

OTHER PUBLICATIONS

Chinese Office Action of Chinese Application No. 201410030869.0, dated Sep. 1, 2015 with English translation.

(Continued)

*Primary Examiner* — Abhishek Sarma
(74) *Attorney, Agent, or Firm* — Collard & Roe, P.C.

(57) ABSTRACT

An interface conversion circuit, a display panel driving method and a display apparatus for realizing UHD image display at least by a LVDS interface together with an UHD display apparatus are provided. The interface conversion circuit comprises a low voltage differential signaling (LVDS) interface and a data format conversion module. The LVDS interface is configured to receive a LVDS signal from a LVDS signal source and transmit the LVDS signal to the data format conversion module. The data format conversion module is configured to convert the received LVDS signal into a digital video interface eDP signal.

12 Claims, 4 Drawing Sheets

(52) U.S. Cl.
CPC ........... *H04N 7/0125* (2013.01); *G09G 5/005* (2013.01); *G09G 2370/10* (2013.01); *G09G 2370/14* (2013.01); *G09G 2370/20* (2013.01)

(56) References Cited

U.S. PATENT DOCUMENTS

2011/0292028 A1* 12/2011 Seo ...................... G09G 3/2096
  345/213
2013/0106996 A1* 5/2013 Tsai ................... H04N 13/0029
  348/43

FOREIGN PATENT DOCUMENTS

CN 202632728 U 12/2012
CN 103794172 A 5/2014

OTHER PUBLICATIONS

International Search Report with Notice of Transmittal of the International Search Report of PCT/CN2014/080508 in Chinese, dated Oct. 27, 2014.
Written Opinion of the International Searching Authority of PCT/CN2014/080508 in Chinese with English translation dated Oct. 27, 2014.

* cited by examiner

INTERFACE CONVERSION CIRCUIT, DISPLAY PANEL DRIVING METHOD AND DISPLAY APPARATUS

CROSS REFERENCE TO RELATED APPLICATIONS

This application is the National Stage of PCT/CN2014/080508 filed on Jun. 23, 2014, which claims priority under 35 U.S.C. § 119 of Chinese Application No. 201410030869.0 filed on Jan. 22, 2014, the disclosure of which is incorporated by reference.

TECHNICAL FIELD OF THE DISCLOSURE

The present disclosure relates to an interface conversion circuit, a display panel driving method and a display apparatus.

BACKGROUND

With the development of display technologies, the resolution of display panels becomes higher and higher. The display whose resolution is not higher than 1280*720 standard definition (SD) cannot meet the demand of some consumers. Full high definition (FHD) displays have begun to be popular, and Ultra high definition (UHD) has also come into the market and becomes the target people pursue.

In terms of internal interfaces of the known technologies, when the conventional low voltage differential signaling (LVDS) interface is applied to the high resolution UHD display panels, many channels are needed and the design is complex. In addition, the conventional system side with a LVDS output interface cannot be compatible with the display panels with an embedded display port (eDP) interface.

SUMMARY

Embodiments of the present disclosure provide an interface conversion circuit, a display panel driving method and a display apparatus for realizing a UHD image display at least by a LVDS interface together with an UHD display apparatus.

The interface conversion circuit comprises a low voltage differential signaling (LVDS) interface and a data format conversion module. The LVDS interface is configured to receive a LVDS signal from a LVDS signal source and transmit the LVDS signal to the data format conversion module. The data format conversion module is configured to convert the received LVDS signal into a digital video interface eDP signal.

In some embodiments, the data format conversion module at least comprises a first data format converter and a second data format converter; the first data format converter is for example configured to convert the LVDS signal into a transistor-transistor logic level (TTL) signal; and the second data format converter is for example configured to convert the TTL signal into the eDP signal.

In some embodiments, the interface conversion circuit further comprises a digital video eDP interface configured to receive an eDP signal from an eDP signal source and to transmit the eDP signal.

In some embodiments, the interface conversion circuit further comprises a switch module whose first input terminal is connected to the data format conversion module, whose second input terminal is connected to the eDP interface, and whose output terminal is connected to a timing controller, wherein the switch module is configured to control the eDP signal from the eDP interface or the eDP signal from the data format conversion module to be output to the timing controller according to a control signal.

In some embodiments, the interface conversion circuit further comprises a controller connected to the switch module and a control interface connected to the controller, wherein the controller is configured to control the switch module to output the eDP signal from the data format conversion module when receiving a first control signal from the control interface and to control the switch module to output the eDP signal from the eDP interface when receiving a second control signal from the control interface.

In some embodiments, the interface conversion circuit further comprises a controller connected to the switch module, wherein a first input terminal of the controller is connected to the LVDS interface, and a second input terminal of the controller is connected to the eDP interface; and the controller is configured to control the switch module to output the eDP signal from the data format conversion module when receiving a first control signal from the LVDS interface and to control the switch module to output the eDP signal from the eDP interface when receiving a second control signal from the eDP interface.

An embodiment of the present disclosure provides a display panel driving method, comprising the following: when receiving a LVDS signal, converting the LVDS signal into an eDP signal and transmitting the eDP signal to a timing controller; and processing the eDP signal by the timing controller and outputting the processed eDP signal to a display panel.

In some embodiments, converting the LVDS signal into the eDP signal is for example converting the LVDS signal into a TTL signal and then converting the TTL signal into the eDP signal.

An embodiment of the present disclosure provides a display apparatus at least comprising an interface conversion circuit and a display panel comprising a timing controller, wherein the interface conversion circuit is any one of the above interface conversion circuits.

Embodiments of the present disclosure provide an interface conversion circuit, a display panel driving method and a display apparatus for realizing UHD image display by a LVDS interface together with an UHD display apparatus. The interface conversion circuit at least comprises a low voltage differential signaling (LVDS) interface and a data format conversion module. The LVDS interface is configured to receive a LVDS signal from a LVDS signal source and transmit the LVDS signal to the data format conversion module. The data format conversion module is configured to convert the received LVDS signal into a digital video interface eDP signal. Thereby, UHD image display is realized by a LVDS interface together with an UHD display apparatus.

DETAILED DESCRIPTION

Embodiments of the present disclosure provide an interface conversion circuit, a display panel driving method and a display apparatus for realizing UHD image display at least by a LVDS interface together with an UHD display apparatus.

The interface conversion circuit comprises a low voltage differential signaling (LVDS) interface and a data format conversion module. The LVDS interface is configured to receive a LVDS signal from a LVDS signal source and transmit the LVDS signal to the data format conversion module. The data format conversion module is configured to convert the received LVDS signal into a digital video interface eDP signal. Thereby, UHD image display is realized at least by a LVDS interface together with an UHD display apparatus.

In order to extend the function of the interface conversion circuit, further, the interface conversion circuit also comprises a digital video eDP interface configured to receive an eDP signal from an eDP signal source and to transmit the eDP signal to a timing controller.

The new digital video interface eDP is a digital interface based on the Display Port structure and protocol, and is a new digital audio and video interface defined by the video electronics standards association (VESA) for replacing the conventional analog video interface (VGA), digital video interface (DVI) and internal interface between the system and the panel (LVDS interface), eDP has large bandwidth and supports HD and UHD. It has large advantages in the HD display. More and more related modules have been applied in the display modules of FHD and higher resolution.

In the following, technical solutions provided by embodiments of the present disclosure will be described exemplarily in connection with the figures.

Figure 1:
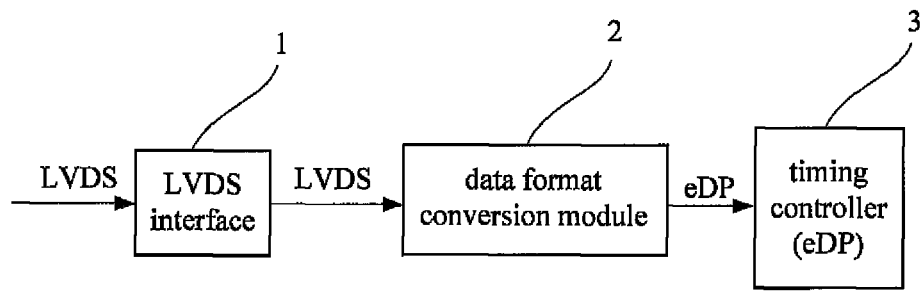
FIG. 1 is a first one of the schematic structural diagrams of an interface conversion circuit provided by an embodiment of the present disclosure.

Referring to FIG. 1, an interface conversion circuit provided by an embodiment of the present disclosure comprises a low voltage differential signaling (LVDS) interface 1 and a data format conversion module 2. The LVDS interface 1 is configured to receive a LVDS signal from a LVDS signal source and transmit the LVDS signal to the data format conversion module 2. The data format conversion module 2 is configured to convert the LVDS signal into a digital video interface eDP signal.

The present disclosure provides the data format conversion module between the timing controller and the LVDS interface to convert the LVDS signal into the digital video interface eDP signal, realizing UHD image display by the LVDS interface. The UHD display panel with such a solution can be configured with a system side with the LVDS interface, improving compatibility between the system side and the display panel.

The data format conversion module 2 is any data format conversion module that can convert the LVDS signal into the eDP signal. For example, the data format conversion module 2 can be a data format converter that directly converts the LVDS signal into the eDP signal, or can be a module that converts the LVDS signal into a signal with a preset format and then converts the signal with the preset format into the eDP signal.

Figure 2:
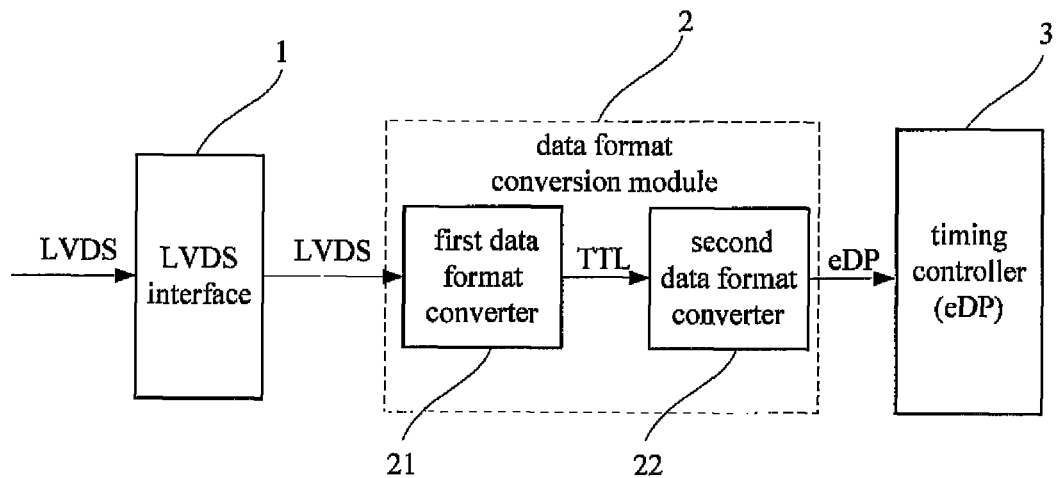
FIG. 2 is an exemplary schematic structural diagram of a data format conversion module provided by an embodiment of the present disclosure.

Referring to FIG. 2, one implementation of the data format conversion module 2 is the following: the data format conversion module 2 comprises a first data format converter 21 and a second data format converter 22; the first data format converter 21 is for example configured to convert the LVDS signal into a signal with a preset format; and the second data format converter 22 is for example configured to convert the signal with the preset format into the eDP signal.

For example, the first data format converter 21 is for example configured to convert the LVDS signal into a transistor-transistor logic level (TTL) signal, that is, to convert the LVDS signal into R[0:9], G[0:9], B[0:9] signals and corresponding control signals; the second data format converter 22 is for example configured to convert the TTL signal into the eDP signal, that is, convert R[0:9], G[0:9], B[0:9] signals and corresponding control signals into an eDP data packet and a control signal.

The above embodiment realizes the conversion of the LVDS signal into the eDP signal by the first data format converter 21 and the second data format converter 22.

Referring to FIG. 1, the interface conversion circuit is connected to the timing controller. The timing controller is configured to receive the eDP signal transmitted from the data format conversion module 2 and to output the eDP signal to the display panel.

For example, the timing controller outputs the eDP signal to the display panel. The timing controller is a timing controller (eDP) with an eDP interface. The display panel is an UHD display panel.

Figure 3:
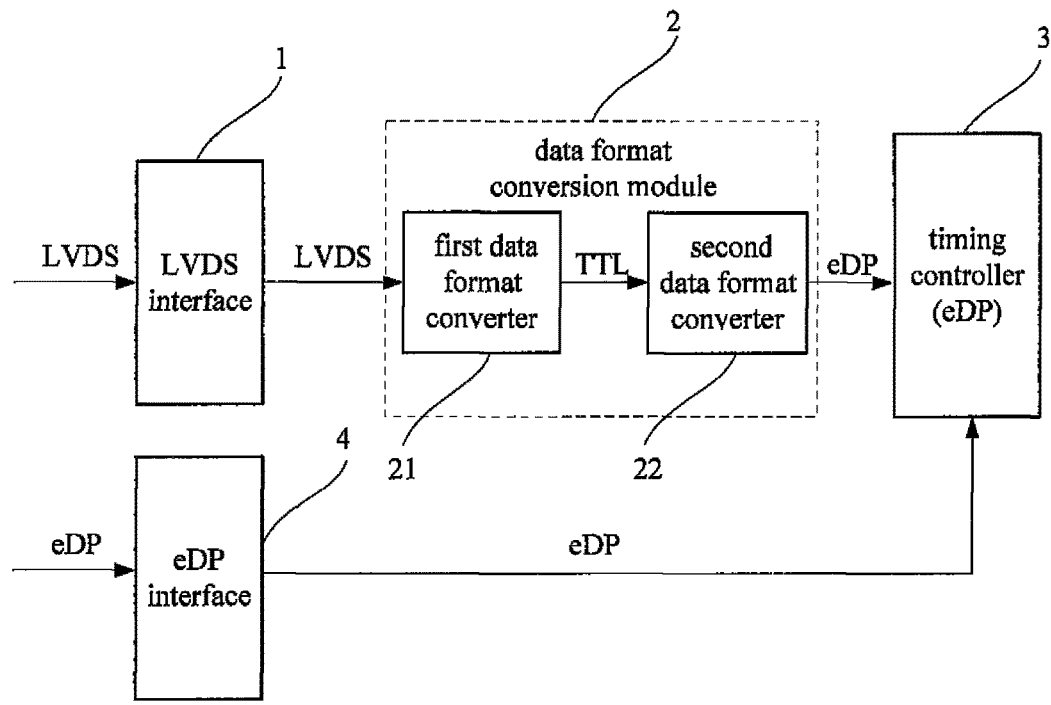
FIG. 3 is a second one of the schematic structural diagrams of an interface conversion circuit provided by an embodiment of the present disclosure.

Further, referring to FIG. 3, the interface conversion circuit provided by an embodiment of the present disclosure further comprises a digital video eDP interface 4 configured to receive an eDP signal from an eDP signal source and to transmit the eDP signal to the timing controller.

For example, when displaying HD images is needed, the eDP signal source is connected to the eDP interface to provide the eDP signal to the display apparatus, or the LVDS signal source is connected to the LVDS interface to realize UHD image display through converting the LVDS signal into the eDP signal by the data format conversion module.

Figure 4:
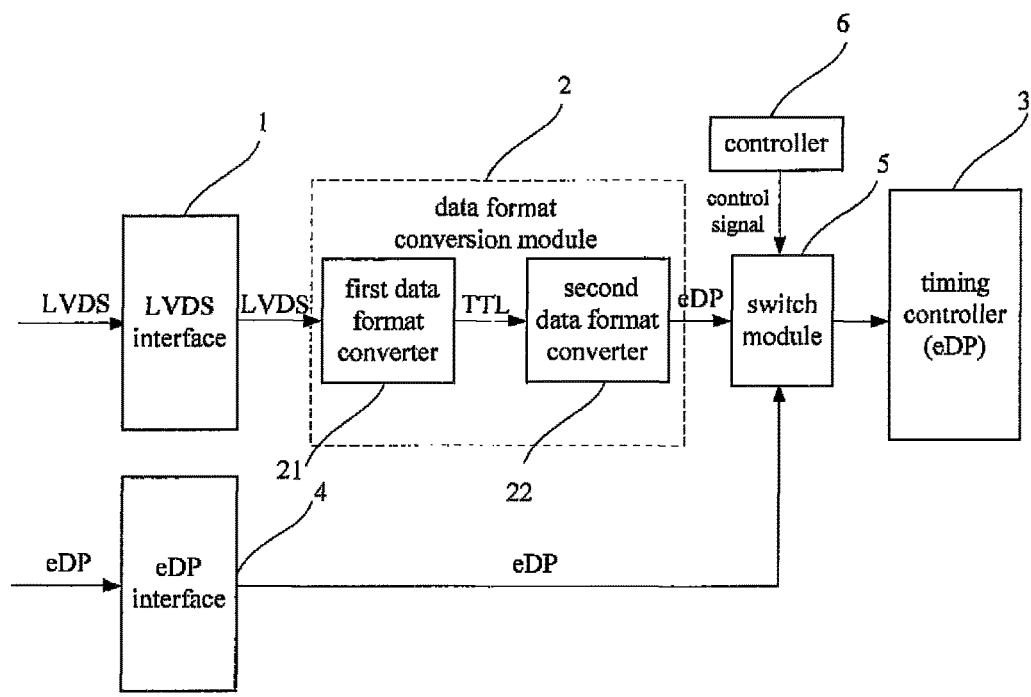
FIG. 4 is a third one of the schematic structural diagrams of an interface conversion circuit provided by an embodiment of the present disclosure.

In order to avoid wrong input when inputting the data from the LVDS signal source and the data provided by the eDP signal source, referring to FIG. 4, the interface conversion circuit provided by an embodiment of the present disclosure further comprises a switch module 5 whose first input terminal is connected to the data format conversion module, whose second input terminal is connected to the eDP interface, and whose output terminal is connected to the timing controller, wherein the switch module is configured to control the eDP signal from the eDP interface or the eDP signal from the data format conversion module to be output to the timing controller according to a control signal.

In other words, at a certain time, only the eDP signal from the data format conversion module or the eDP signal from the eDP interface can be sent to the timing controller to avoid the mistake of sending the eDP signal from the data format conversion module and the eDP signal from the eDP interface to the timing controller simultaneously.

In some embodiments, the switch module can be a Single-Pole-Double-Throw switch.

Referring to FIG. 4, further, the interface conversion circuit also comprises a controller 6 connected to the switch module 5, wherein the controller 6 is configured to control the switch module 5 to output the eDP signal from the data format conversion module when receiving a first control signal and to control the switch module 5 to output the eDP signal from the eDP interface when receiving a second control signal.

The system side outputs the first control signal or the second control signal to the controller to inform the controller to output the eDP signal of the corresponding interface to the timing controller while outputting the LVDS signal or the eDP signal.

For example, it can be defined that the controller controls the switch module to output the eDP signal from the data format conversion module when receiving a high level signal, and the controller controls the switch module to output the eDP signal from the eDP interface when receiving a low level signal. As such, the system side can control switch module to output the eDP signal by supplying a high level or a low level signal to the controller while outputting the LVDS interface signal.

Figure 5:
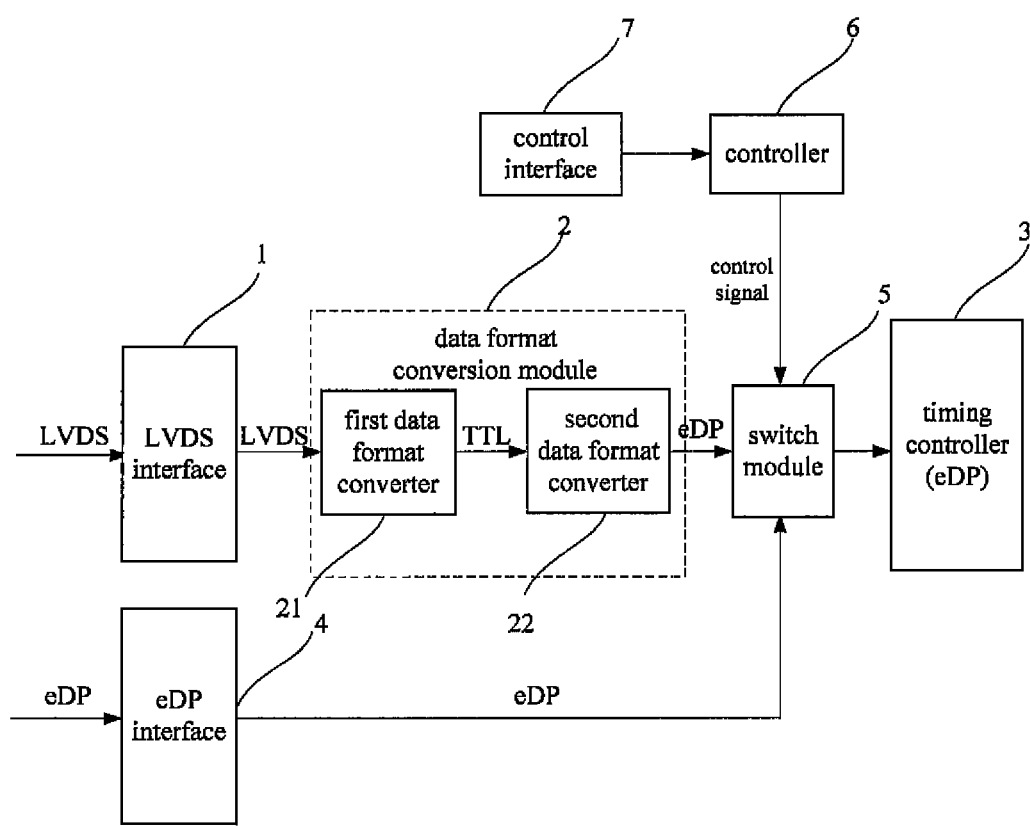
FIG. 5 is a fourth one of the schematic structural diagrams of an interface conversion circuit provided by an embodiment of the present disclosure.
Figure 6:
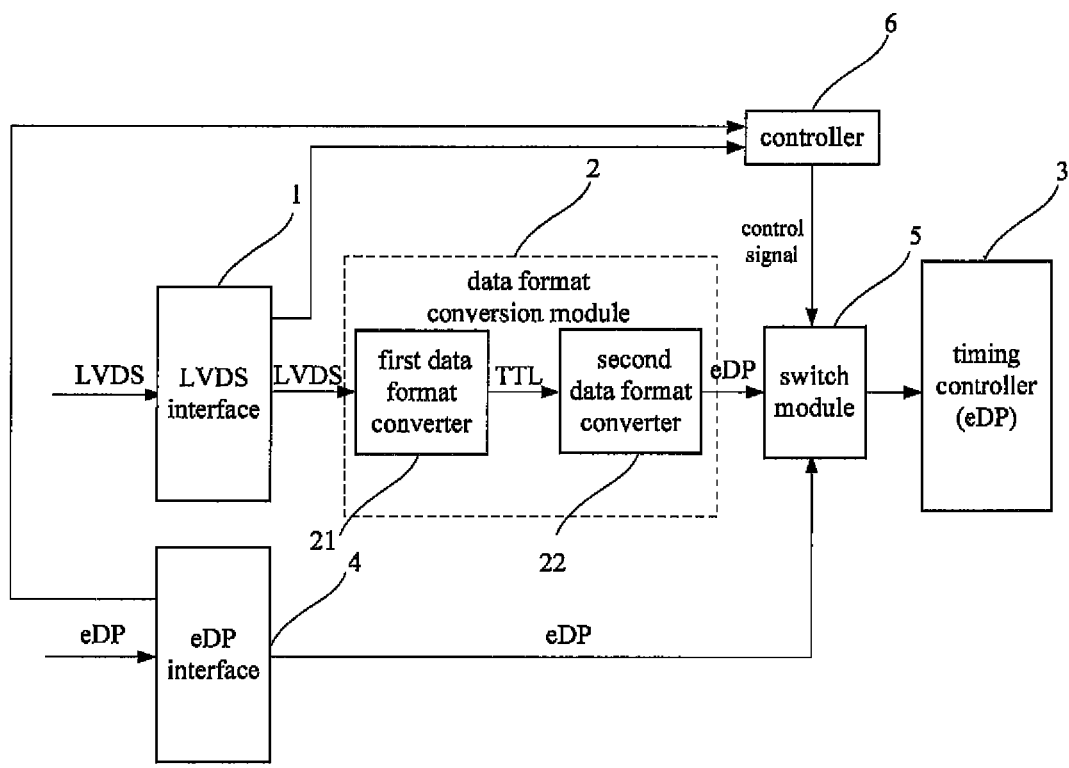
FIG. 6 is a fifth one of the schematic structural diagrams of an interface conversion circuit provided by an embodiment of the present disclosure.

The switch module can be realized by a control interface. As shown in FIG. 5, the control interface can be a control interface 7 separate from the eDP interface and the LVDS interface, or can also be an interface embedded into the eDP interface and the LVDS interface. As shown in FIG. 6, the switch module can also be embedded into the eDP interface and the LVDS interface, that is, the eDP interface and the LVDS interface both have the function of transmitting a control signal.

For example, referring to FIG. 5, based on the interface circuit shown in FIG. 3, in addition to the switch module, the interface circuit further comprises a controller 6 connected to the switch module 5 and a control interface 7 connected to the controller 6. The controller 6 is configured to control the switch module 5 to output the eDP signal from the data format conversion module 2 when receiving a first control signal from the control interface 7 and to control the switch module 5 to output the eDP signal from the eDP interface 4 when receiving a second control signal from the control interface 7.

Referring to FIG. 6, based on the interface circuit shown in FIG. 3, in addition to the switch module, the interface circuit further comprises a controller 6 connected to the switch module 5, wherein a first input terminal of the controller 6 is connected to the LVDS interface 2, and a second input terminal of the controller 6 is connected to the eDP interface 4; and the controller 6 is configured to control the switch module 5 to output the eDP signal from the data format conversion module 2 when receiving a first control signal from the LVDS interface 1 and to control the switch module 5 to output the eDP signal from the eDP interface when receiving a second control signal from the eDP interface 4.

An embodiment of the present disclosure also provides a display apparatus at least comprising an interface conversion circuit and a display panel comprising a timing controller, wherein the interface conversion circuit is any one of the interface conversion circuits provided by the above embodiments. The display apparatus can be a liquid crystal panel, a liquid crystal display, a liquid crystal TV set, an organic electroluminescence display OLED panel, an OLED display, an OLED TV set, an electronic paper or the like.

An embodiment of the present disclosure also provides a display panel driving method, which, based on the interface conversion circuit, comprises the following: when the data format conversion module receives a LVDS signal, converting the LVDS signal into an eDP signal and transmitting the eDP signal to the timing controller; and the timing controller processing the eDP signal and outputting the processed eDP signal to a display panel.

The procedure of the timing controller processing the eDP signal is to process the eDP signal as a gray-scale voltage signal for driving pixels to realize image display. The procedure is similar to the known technology, which will not be repeatedly described here.

Since the LVDS signal can reduce electromagnetic disturbance and has high immunity from noise, currently, data transmission through the LVDS interface still occupies a large portion.

Further, the LVDS signal is converted into the eDP signal, for example, the LVDS signal is converted into a TTL signal which is then converted into the eDP signal.

Of course, it is not limited to convert the LVDS signal into the TTL signal.

Before the data format conversion module transmits the eDP signal to the timing controller, it transmits the eDP signal to the switch module, transmits a control signal to the controller, and the controller switches on a corresponding data channel of the switch module based on the control signal so as to transmit the eDP signal to the timing controller.

In conclusion, embodiments of the present disclosure provide a data format conversion module between the timing controller and the LVDS interface to convert the LVDS signal from the LVDS interface into the eDP signal, and the timing controller receives the eDP signal to drive the display panel to realize UHD image display. Further, an eDP interface connected to the timing controller is also provided to realize that an eDP signal drives the display panel to realize UHD image display and the function of multi-interface input at the same time. The compatibility between the signal source system side and the display panel is improved.

Obviously, those skilled in the art can make various modifications and variations to the present disclosure without departing from the spirit and the scope of the present disclosure. As such, if those modifications and variations fall within the scope of the claims and their equivalent of the present disclosure, the present disclosure is intended to incorporate those modifications and variations.

The present application claims the priority of Chinese Patent Application No. 201410030869.0 filed on Jan. 22, 2014, entire content of which is incorporated as part of the present invention by reference.

What is claimed is:

1. An interface conversion circuit comprising a low voltage differential signaling (LVDS) interface, a digital video (eDP) interface, a timing controller and a data format conversion module, wherein
    the LVDS interface is configured to receive a LVDS signal from a LVDS signal source and transmit the LVDS signal to the data format conversion module;
    the eDP interface is configured to receive a first eDP signal from an eDP signal source and to transmit the first eDP signal to the timing controller;
    the data format conversion module is configured to convert the received LVDS signal into a second eDP signal and to transmit the second eDP signal to the timing controller; and
    the timing controller is configured to receive the first eDP signal from the eDP interface or the second eDP signal from the data format conversion module.

2. The interface conversion circuit according to claim 1, wherein the data format conversion module at least comprises a first data format converter and a second data format converter;
the first data format converter is configured to convert the LVDS signal into a transistor-transistor logic level (TTL) signal; and
the second data format converter is configured to convert the TTL signal into the second eDP signal.

3. The interface conversion circuit according to claim 1, further comprising a switch module whose first input terminal is connected to the data format conversion module, whose second input terminal is connected to the eDP interface, and whose output terminal is connected to the timing controller, wherein the switch module is configured to control the first eDP signal from the eDP interface or the second eDP signal from the data format conversion module to be output to the timing controller according to a control signal.

4. The interface conversion circuit according to claim 3, further comprising a controller connected to the switch module, wherein the controller is configured to control the switch module to output the second eDP signal from the data format conversion module when receiving a first control signal and to control the switch module to output the first eDP signal from the eDP interface when receiving a second control signal.

5. The interface conversion circuit according to claim 3, further comprising a controller connected to the switch module and a control interface connected to the controller, wherein
the controller is configured to control the switch module to output the second eDP signal from the data format conversion module when receiving a first control signal from the control interface and to control the switch module to output the first eDP signal from the eDP interface when receiving a second control signal from the control interface.

6. The interface conversion circuit according to claim 3, further comprising a controller connected to the switch module, wherein a first input terminal of the controller is connected to the LVDS interface, and a second input terminal of the controller is connected to the eDP interface; and
the controller is configured to control the switch module to output the second eDP signal from the data format conversion module when receiving a first control signal from the LVDS interface and to control the switch module to output the first eDP signal from the eDP interface when receiving a second control signal from the eDP interface.

7. A display apparatus comprising an interface conversion circuit and a display panel comprising a timing controller, wherein the interface conversion circuit is an interface conversion circuit comprising a low voltage differential signaling (LVDS) interface, a digital video (eDP) interface, a timing controller and a data format conversion module, wherein
the LVDS interface is configured to receive a LVDS signal from a LVDS signal source and transmit the LVDS signal to the data format conversion module;
the eDP interface is configured to receive a first eDP signal from an eDP signal source and to transmit the first eDP signal to the timing controller;
the data format conversion module is configured to convert the received LVDS signal into a second eDP signal and to transmit the second eDP signal to the timing controller; and
the timing controller is configured to receive the first eDP signal from the eDP interface or the second eDP signal from the data format conversion module.

8. The display apparatus according to claim 7, wherein the data format conversion module at least comprises a first data format converter and a second data format converter;
the first data format converter is configured to convert the LVDS signal into a transistor-transistor logic level (TTL) signal; and
the second data format converter is configured to convert the TTL signal into the second eDP signal.

9. The display apparatus according to claim 7, further comprising a switch module whose first input terminal is connected to the data format conversion module, whose second input terminal is connected to the eDP interface, and whose output terminal is connected to the timing controller, wherein the switch module is configured to control the first eDP signal from the eDP interface or the second eDP signal from the data format conversion module to be output to the timing controller according to a control signal.

10. The display apparatus according to claim 9, further comprising
a controller connected to the switch module, wherein the controller is configured to control the switch module to output the second eDP signal from the data format conversion module when receiving a first control signal and to control the switch module to output the first eDP signal from the eDP interface when receiving a second control signal.

11. The display apparatus according to claim 9, further comprising a controller connected to the switch module and a control interface connected to the controller, wherein
the controller is configured to control the switch module to output the second eDP signal from the data format conversion module when receiving a first control signal from the control interface and to control the switch module to output the first eDP signal from the eDP interface when receiving a second control signal from the control interface.

12. The display apparatus according to claim 9, further comprising
a controller connected to the switch module, wherein a first input terminal of the controller is connected to the LVDS interface, and a second input terminal of the controller is connected to the eDP interface; and
the controller is configured to control the switch module to output the second eDP signal from the data format conversion module when receiving a first control signal from the LVDS interface and to control the switch module to output the first eDP signal from the eDP interface when receiving a second control signal from the eDP interface.

* * * * *